May 26, 1959     J. A. TANKERSLEY     2,888,109

BRAKE ADJUSTER

Filed Dec. 9, 1955

INVENTOR.
JAMES A. TANKERSLEY
BY John A. Young
ATTORNEY

United States Patent Office 2,888,109
Patented May 26, 1959

2,888,109

BRAKE ADJUSTER

James A. Tankersley, South Bend, Ind., assignor to Bendix Aviation Corporation, South Bend, Ind., a corporation of Delaware Application December 9, 1955, Serial No. 552,061

7 Claims. (Cl. 188—196)

This invention relates to a brake adjuster for use in disk brake systems wherein relatively rotatable and nonrotatable members are laterally clamped together for frictional engagement. The friction surfaces of the members are abraded as a normal incident to brake application, thereby causing a reduction in width of the friction members. This reduction produces greater clearances between the relatively rotatable and nonrotatable members with the result that a greater amount of pedal travel must be used in taking up clearances of the brake before the brake members are brought into frictional engagement.

In order to maintain constant clearance between the friction members regardless of wear, various automatic adjusters have been proposed for this purpose. In general, these automatic adjusters function to vary the retracted position of the pressure plate, thus laterally contacting the rotatable and nonrotatable members responsively to wear thereof so that the members maintain a constant relative clearance, notwithstanding their diminishing width.

In adjusters of the general class described, it is essential to prevent operation of the automatic adjuster until a predetermined clearance in the brake members is exceeded. Once the clearance of the brake members is exceeded, it is then desirable to initiate operation of the automatic adjuster to maintain the predetermined clearance. In those prior adjusters with which I am acquainted, friction members are used to prevent operation of the adjuster until this established clearance is exceeded. The present invention proposes, however, to eliminate the friction principle in favor of a "brinnelling" type principle in which one member is protruded into the surface of another member to become embedded therein, thus preventing relative movement of the members until sufficient force is developed which will produce furrowing grooves or groove in the surface of the one member. I have found that this technique is more reliable and lends itself to better adjustment than the "friction means" principle.

Objects and features of the invention other than those specifically set forth, will become apparent from a consideration of the following description which proceeds with reference to the accompanying drawings, wherein.

Figure 1:
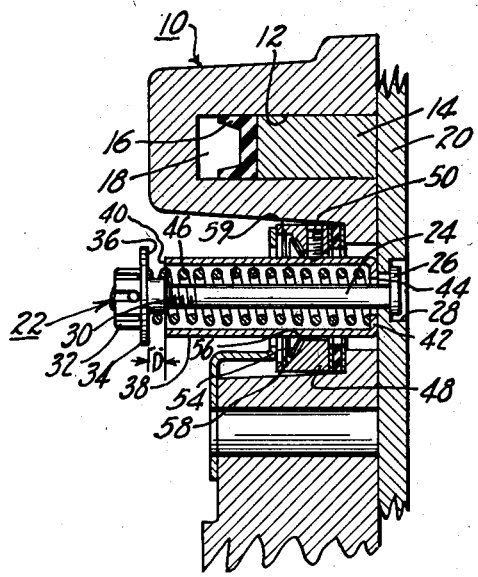
Figure 1 is a fragmentary view of a brake with one embodiment of the automatic adjuster.

Referring to the drawings, there is shown a brake housing 10. An annular cylinder bore 12 is formed in the carrier 10 and an annular piston 14 is slidably received in cylinder bore 12. A suitable seal 16 is fitted on the one end of the piston, thus making a fluid tight chamber 18 wherein pressure is developed to displace the piston 14 toward the right. The piston 14 is engageable with pressure plate 20, said pressure plate being used to urge the relatively rotatable and nonrotatable brake members (not shown) together into frictional engagement. Circumferentially spaced on the housing 10 and located between the pistons are a number of brake adjusters, one of which is shown at 22.

The number of brake adjusters is dictated by the amount of residual pressure in chamber 18, which must be overcome by the brake adjuster, and also the size of the brakes. The adjusters are equally spaced around the pressure plate in order to prevent tilting or cocking of the pressure plate as it is returned. The adjuster 22 consists of a pin 24 having an enlarged end 26 which is received in a recess 28 of the pressure plate 20. The pressure plate 20 and pin 24 are thus secured together so that as the pressure plate 20 moves toward the right, it pulls the pin 24 with it. The other end 30 of the pin is threaded to receive a nut 32 having a transversely mounted washer 34. The washer 34 provides an abutment shoulder 36.

Surrounding the pin 24 is a sleeve 38 which has an open end 40. The other end 42 of the sleeve 38 is closed to form an abutment 44 which limits retraction of the pressure plate 20. A helical spring 46 is compressed within the interior of the sleeve between end 42 and shoulder 36 of washer 34. The compressed spring 46 urges the stem 30 toward the left, thus pulling the pressure plate against abutment 44 of the sleeve. The pressure plate remains in this position during retraction of the brake.

As indicated in Figure 1, there is a clearance "D" between the shoulder 36 on the washer 34, and the open end 40 of the tubular member 38; this clearance represents the clearance which is maintained between the rotatable and nonrotatable parts of the brake throughout the wear-life of the brake.

A circular member 48 is fixedly secured to the housing 10 and remains stationary during operation of the device. A number of spaced set screws 50 are threadedly received in circular member 48. The ends of the set screws may be conically, spherically, or elliptically shaped. The set screws are turned down until ends 52 become embedded in the surface of the sleeve 38. Once the ends 52 are protruded into the surface of the sleeve, there is provided a resistance to movement of the sleeve 38 toward the right since this movement can only proceed by furrowing or grooving tracks in the surface of the sleeve.

A canted washer 54 having fingers 56 which grip the periphery of the sleeve, resist movement of the sleeve depending upon the direction of movement thereof. The inclination of the fingers 56 is such that the fingers resist movement of the sleeve toward the left but permit movement of the sleeve toward the right. The canted washer is held in position by means of a snap ring 58 which is fitted into stepped end 59 of the circular member 48.

Figure 2:
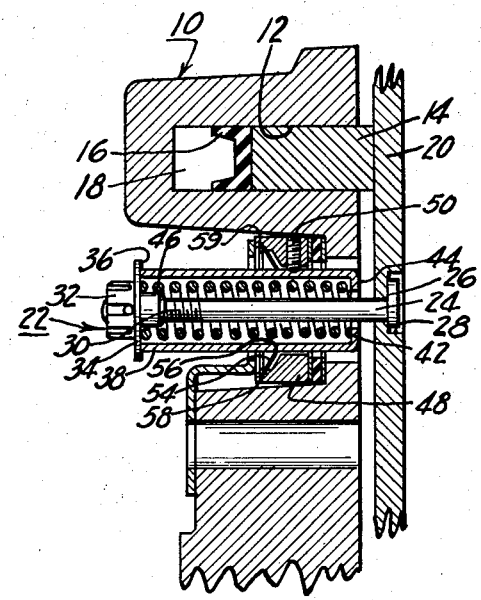
Figure 2 shows the condition of the automatic adjuster in Figure 1 when the brake is worn considerably and the adjuster is about to render an adjustment.
Figure 3:
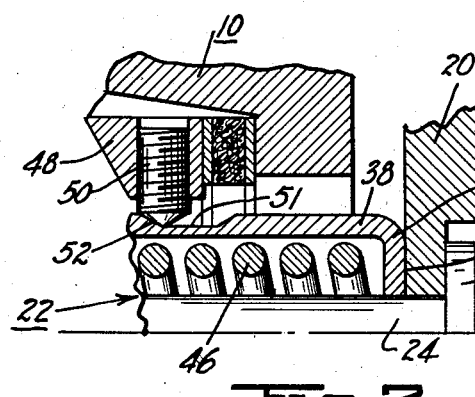
Figure 3 is an enlarged fragmentary view showing the sleeve of the adjuster after the brake has been adjusted.

In operation, fluid pressure is introduced to the chamber 18 moving the piston 14 toward the right (Figure 2). The piston 14 bears against the pressure plate 20 and displaces the pressure plate 20 toward the right until the friction members are fully applied. Assuming that the friction members have worn, an automatic adjustment of the brake takes place as follows:

Referring to Figure 2, it will be noted that the pressure plate 20 is displaced toward the right from the position shown in Figure 1. This movement of the pressure plate 20 pulls the stem 24 therewith, bringing the washer 34 toward the end 40 of the sleeve 38. The sleeve 38 remains stationary until the clearance "D" is completely closed, whereupon any further movement of the stem 24 will, acting through the shoulder 36, pull the sleeve 38 toward the right against the resistance of the set screws 50. The brake applying effort is sufficient to overcome the resistance offered by the set screws 50 which furrow paths 51 (Figure 3) in the wall of the sleeve 38 as the sleeve moves rightwardly.

As the clearance "D" is taken up, spring 46 is compressed so that when the brake applying effort is released, the stem 24 is pushed toward the left by the spring, pulling the pressure plate 20 therewith, through the retraction distance "D," until the pressure plate re-engages the end 42 of the sleeve. It will be noted, however, that the end 42 of the sleeve 38 has been drawn toward the right by the movement of stem 24 which pulls the sleeve 34 therewith through the washer 34, so that the pressure plate 20 is prevented from returning to its original position. By this repositioning of the pressure plate 20, the running clearance of the brake is maintained. The net result is that the pressure plate 20 is incrementally moved farther toward the right as wear progresses. Residual pressure in the chamber 18 causes the piston 14 to follow up the movement of the pressure plate to the right so that upon the next brake application the same amount of pedal stroke takes up the brake clearance regardless of wear of the brake.

It is essential to proper functioning of the adjuster that an adjustment take place only when the clearance "D" is exceeded. Accordingly, it is necessary to fix the sleeve 38 against any movement by the spring 46 as it is compressed during rightward movement of the pressure plate 20. Although the spring force must not move the sleeve, the sleeve must not be too rigidly held against movement after the distance "D" is taken up; otherwise excessive applying effort is expended for operating the adjuster rather than operating the brake. I have found that the "set screw" method offers an easily adjusted means for controlling the retarding effort on movement of the sleeve so that sufficient resistance is easily provided for preventing movement of the sleeve by the spring and yet excessive impedance is avoided which would cause a loss in applying effort.

In the case of an aircraft brake where the wheel is retracted, the components of the brake are rotated 90° counterclockwise from that shown in Figure 1. The weight of the brake is then carried by the sleeve 38. The set screws 50, which are embedded in the surface of the sleeve 38, offer insufficient resistance to provide support for the brake. Accordingly, the washer 54, serving as a one-way clutch, prevents movement of the sleeve so that the weight of the brake may be thus carried through the adjuster. The one-way clutch 54 does not interfere with adjustment operation or provide further resistance to movement of the sleeve 38 toward the right, this resistance being provided entirely by the set screws 50.

Figure 4:
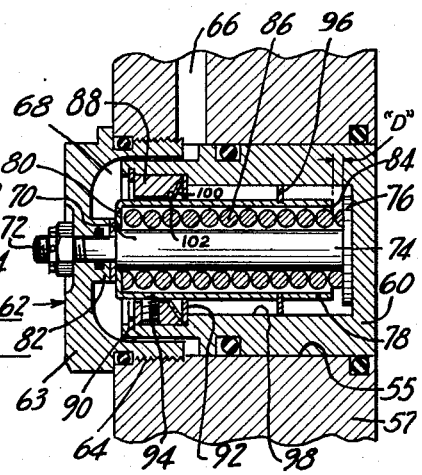
Figure 4 is a second embodiment of the adjuster shown mounted within a fluid motor actuator for a disk brake.

Referring to Figure 4, the adjuster is shown mounted within a fluid motor. This is a suitable arrangement where a number of fluid motors are used instead of a single fluid motor.

In this embodiment, a number of circumferentially spaced pistons are provided in the brake assembly and an adjuster may be provided in association with each of these separate fluid motors. The adjuster, as shown in Figure 4, is fitted into an opening 55 of carrier plate 57. The opening 55 serves in this case as a cylinder wall for the piston 60. The adjuster, designated generally by reference numeral 62, is positioned in the carrier plate by means of a cap 63 at one end thereof which is threadedly received at 64 in the end of the cylinder bore 55. A fluid passage 66 is formed in the carrier 57 and communicates fluid pressure to the chamber 68 within the adjuster to move the piston 60 toward the right. A stem 70 is fixedly secured at one end 72 to the cap 63 and at the other end 74 there is formed a shoulder 76. Sleeve (or tube) 78 has a closed end 80 which abuts against a boss 82 formed integrally with cap 63 and an open end 84 which contacts the shoulder 76. A coil spring 86 is compressed between the closed end 80 of the tube 78 and shoulder 76 which is located at the end of the stem 74. Surrounding the tube is a ring 88 which is carried by the piston 60 through a snap ring 90 and a washer 92. Set screws 94 are located in the ring 88 and protrude into the surface of the tube 78. A stop 96 is fixed to the tube 78 and the periphery of the stop 96 slides along the surface of opening 98 in the piston. The stop 96 is contacted by the washer 92, preventing further rightward movement of the piston 60. A canted washer 100 having fingers 102 which grip the periphery of the tube 78, resist movement of the tube depending upon the direction of movement thereof. The fingers 102 are inclined such that they resist movement, relative to tube 78, of the piston 60 toward the left but permit movement of the piston toward the right. The canted washer is disposed in an annular space formed in the ring 88 and is held in place by the washer 92.

In operation, fluid pressure is introduced to chamber 68 via inlet passage 66, thus displacing piston 60 toward the right. The piston movement carries the ring 88 therewith. The set screws 94, which are carried by the ring 88, force the sleeve or tube 78 toward the right against the resistance of spring 86. The tube 78 continues to move toward the right until it engages the shoulder 76; thereafter, any further piston movement produces relative movement between the ring 88 and the tube 78, thus causing a furrowing in the surface of the tube 78 by the set screws 94.

It will be noted that the clearance between the shoulder 76 and the end 84 of the tube represents the established clearance in the brake. The piston 60 does not move relatively to the sleeve 78 until this clearance is exceeded. If this clearance is exceeded, then the piston is displaced to a new position relative to the sleeve in a generally rightward direction.

When the brake is released, return spring 86 moves the tube 78 away from contact with the shoulder 76 and toward the left until closed end 80 engages the boss 82. This return movement of the sleeve toward the left also returns the piston 60 through a like distance. The sleeve exerts effort on the piston through the set screws 92. Thus, regardless of the extent of movement of the pistons 60 toward the right, the pistons will always be returned through the same distance "D," indicated by the clearance between the end 84 of the tube and the shoulder 76. Because the piston 60 is moved farther toward the right, the pressure plate (not shown) with which it engages is also displaced toward the right to compensate for wear (reduction in width) of the brake components. Thus, the clearance between the brake components remains the same regardless of wear thereof.

If the brakes should be applied while the rotors and stators are removed, the piston 60 is prevented from moving completely out of the cylinder bore 55 since the washer 92 will move into engagement with fixed stop 96 which is secured to the tube 78. This safety feature prevents accidental blowing out of the piston if the brakes should be applied while the brake is disassembled.

In the case of an aircraft brake where the wheel is retracted, the components of the brake are rotated 90° counterclockwise from that shown in Figure 1. The weight of the brake is then carried by the piston 60. The set screws 94, which are embedded in the surface of the tube 78, offer insufficient resistance to provide support for the brake. Accordingly, the washer 100, serving as a one-way clutch prevents movement of the piston 60 so that the weight of the brake is carried through the adjuster. As in the case of the one-way clutch 54 of Figure 1, the one-way clutch 100 does not interfere with adjustment operation.

Although only two embodiments of the invention have been described and claimed, it will be understood that numerous modifications of the invention may be made without departing from the underlying principles of the invention. I intend, therefore, to include within the scope of the following claims all such revisions and modifications as may be made of the invention which incorporate the principles thereof.

I claim:

1. An automatic adjuster comprising a housing, a pressure-responsive member reciprocably received in said housing, a pressure plate located adjacent said housing and contacted by said pressure-responsive member for actuation thereby, a stem fixedly secured at one end to said pressure plate and extending laterally therefrom, said stem having a transverse abutment at the opposite end thereof, a sleeve which surrounds said stem and engages said pressure plate at one end to serve as a stop determining the retracted position thereof, a helical spring compressed within said sleeve and arranged to bear against the abutment on said stem to retract the pressure plate, the abutment on said stem and the end of the sleeve being arranged for engagement following movement of the stem by the pressure plate in excess of a predetermined amount so that said stem causes adjustable movement of the sleeve, means embedded in the wall of said sleeve to prevent movement thereof by the spring force, said means permitting movement of the sleeve by said stem to thereby cause a grooving in the wall of said sleeve, and a one-way clutch permitting movement of said sleeve only in an adjusting direction.

2. In a brake having a laterally movable pressure plate, a brake adjuster comprising a cylindrical member which provides a stop for the pressure plate through operative engagement therewith, means for adjustably moving said cylindrical member when the pressure plate is displaced in excess of a predetermined amount, resilient means which maintain the pressure plate in a normally retracted position, means embedded in the wall of said cylindrical member to resist movement of the cylindrical member by said resilient means, and clutch means which fix the position of the cylindrical member when the weight of the brake is carried by said cylindrical member.

3. In a brake, the combination of; an axially movable pressure plate, means responsive to the axial movement of said pressure plate and operatively connected thereto, means engageable by said first mentioned means to be movable therewith, a lost motion connection between said aforementioned two means, a resilient member which is loaded by relative movement between said aforementioned means to yieldably resist such relative movement, fixed means operatively combined with said second mentioned means, and means fixed in said last mentioned means and arranged for protrusion within said second mentioned means to produce a grooving in said second mentioned means during movement thereof.

4. In a brake, the combination of; an axially movable pressure plate, an elongated stem responsive to the axial movement of said pressure plate and operatively connected thereto, a tubular member engageable by said first mentioned means to be movable therewith, a lost motion connection between said aforementioned stem and tubular member, a resilient member which is loaded by relative movement between said aforementioned stem and tubular member to yieldably resist such relative movement, fixed means operatively combined with said tubular member, and means fixed in said last mentioned means and arranged for protrusion within said tubular member to produce a grooving therein.

5. In a brake, the combination of an axially movable brake member, a first means operatively connected to said brake member and movable therewith, second means axially movable with said first means by being pulled therewith, a lost motion connection between said first and second mentioned means which permits limited relative axial movement therebetween, said lost motion connection serving to couple said first and second means when the brake member moves in excess of the lost motion clearance between said first and second means, a resilient member which yieldably resists relative movement between said first and second means during actuation of the brake through the distance provided in said lost motion connection, and a relatively fixed member operatively combined with said second means and arranged to protrude within said second means to produce a furrowing therein when said second friction means is caused to move with said first friction means.

6. In a brake having a laterally movable pressure plate, a tubular member which provides a stop for said movable pressure plate through operative engagement therewith, a resilient member operatively connected between said pressure plate and said tubular member and arranged to urge said pressure plate to a retracted position against said stop, means including a lost motion connection between said pressure plate and said tubular member whereby said tubular member is caused to move in follow-up to said pressure plate when said pressure plate is moved in excess of a predetermined amount, means embedded in the surface of said tubular member to resist movement thereof by said resilient member when said pressure plate is actuated, said tubular member being slidably relocatable relative to said last named means when said pressure plate is moved in excess of said predetermined amount whereupon said last named means groove furrows in the wall of said tubular member, and a one-way clutch operatively connected to said tubular member for holding said tubular member in position when the weight of the brake is supported by said tubular member.

7. In a brake adjuster, an adjustably displaceable means providing a fixed stop which determines the retracted position of the brake elements, a member fixedly secured to one of the brake elements and movable therewith, a lost motion connection between said member and said displaceable means, resilient means which maintain the brake in retracted position, said member being arranged to engage said displaceable means when said one of the brake elements is moved in excess of a predetermined amount, whereupon said displaceable means is moved in follow-up to movement of said one of the brake elements, and means embedded in the surface of said displaceable means for resisting movement thereof except when said displaceable means is moved in follow-up to movement of said one of the brake elements.

No references cited.